P. A. PERRY.
GRAIN BINDER.

No. 113,792.

Patented Apr. 18, 1871.

Witnesses.
Wm. Thornton
Charles Rogers

Inventor:
Perigo A. Perry

P. A. PERRY.
GRAIN BINDER.

No. 113,792. Patented Apr. 18, 1871.

Witnesses.
John Thornton
Charles Rogers

Inventor:
Pierzo A. Perry

United States Patent Office.

PREVIZE A. PERRY, OF PERTH AMBOY, NEW JERSEY.

Letters Patent No. 113,792, dated April 18, 1871.

IMPROVEMENT IN GRAIN-BINDERS.

The Schedule referred to in these Letters Patent and making part of the same.

*To all whom it may concern:*

Be it known that I, PREVIZE A. PERRY, of Perth Amboy, in the county of Middlesex and State of New Jersey, have invented a new and improved Grain-Binder; and I do hereby declare that the following is a full and exact description thereof, reference being had to the accompanying drawing forming a part of this specification, and to the letters of reference marked thereon.

My invention has for its object to provide a machine for binding grain as it is cut by a reaper, constructed and arranged in the manner hereinafter described, that it will receive the grain as it leaves the reaper, and automatically bind the same into sheaves in the most perfect manner, requiring but one man to operate it, and thus effecting a great saving in the cost of labor.

My invention consists in the novel and peculiar construction and arrangement of a series of nippers or jaws, which operate in connection with two sets of curved arms, which receive the grain from a platform attached to the reaper, and hold the sheaves until they are bound, the whole being operated by means of a series of levers and gear-wheels, to which motion is imparted from the traction-wheels of the reaper.

More particularly it consists in the combination of the said nippers and rod with a wedge-shaped slot and a spring secured to the platform, for the purpose of causing the nippers alternately to grasp and release the string.

It also consists in two other pairs of nippers, of novel and peculiar construction, provided with cutting or knife-edges, which move in opposite directions across the sheaf while grasping the string, for the purpose of forming a double knot, and which cut the string when the sheaf has been bound, one pair of which said nippers is secured on the end of a reciprocating rod, and the other pair on a spiral arm, which fits and works upon a round arm secured to the platform, which latter pair revolve around the other pair as they move in opposite directions, and thus form a knot on the string; and also, in the combination of these said nippers with two wedge-shaped slots and two jaws, the former for closing the nippers when they seize the string, and the latter for holding the ends of the string until it is again seized by the nippers in their next forward movement.

To enable others skilled in the art to make and use my invention, I will proceed more particularly to describe its construction and operation.

Letters of like name and kind indicate like parts in each of the figures.

A represents the platform to which the working parts of my improved machine are secured, which said platform may be made of any suitable material, and of such form as to accommodate the working parts of the machine, and is attached to the reaper in any convenient manner so as to receive the grain therefrom as it is cut.

Figure 1:
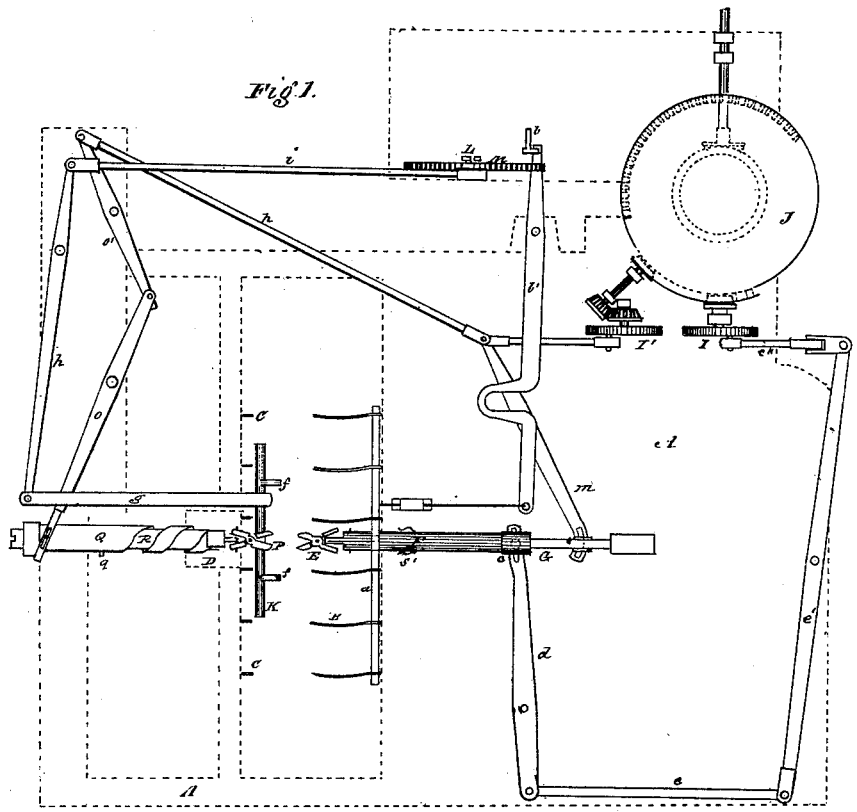
Figure 1 is a plan view of my improved machine showing the relative arrangement of the various parts, the platform being removed and its outlines shown in dotted lines.
Figure 2:
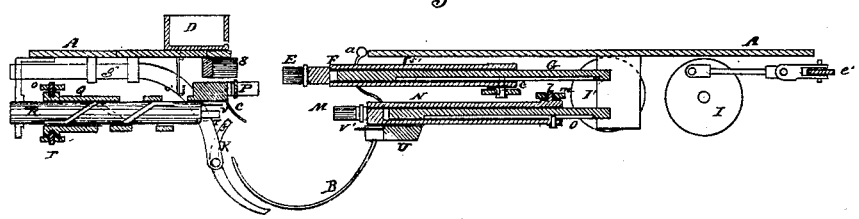
Figure 2 is a vertical longitudinal section taken through the line *x x*.
Figure 3:
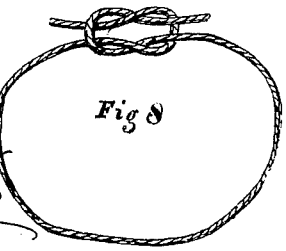
Figure 3 is a detached view of the lever and pawl and ratchet for operating the arms which compress the sheaf.
Figure 3:
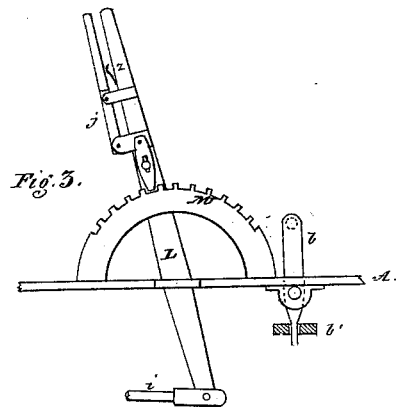

In fig. 1 the outlines of the platform are shown in dotted lines.

B represents a set of curved arms attached to a rod, *a*, which is hinged to the platform.

The outer ends of these arms are raised by means of the levers *b* and *b'*, operated by the foot of the person in charge of the machine, so that they press against a second set of curved arms, C, rigidly secured to the platform, and hold the grain in sufficient quantities to form a sheaf, until it is bound in the manner hereinafter described.

A portion of the platform immediately above these arms is cut away or left open, so as to allow the grain to fall into the arms.

D is a box secured to the platform for the purpose of holding a ball of twine with which to bind the grain.

A perforation is provided near the bottom of this box for the twine to pass out.

E represents a pair of nippers, which is secured by a pivot joint to the end of a rod, F, which fits and works upon an inner rod, G, which latter rod is rigidly secured underneath the platform.

A reciprocating motion is imparted to the rod E by means of a pin, *c*, located near its inner end, which works within a curved slot at the end of a lever, *d*, the latter of which is operated through the medium of the levers *e* and *e'*, and pitman *e''*, which receive motion from a crank-pin secured to the wheel I.

A pinion attached to said wheel gears with a driving-wheel, J, which latter imparts motion to the working parts of the binder, and is itself driven by the machinery of the reaper, to which the binder is attached.

These nippers E are for the purpose of seizing and holding the end of the string until the sheaf is secured therein, and their construction and operation will hereinafter be more fully described.

K is a bar provided with two curved arms, $ff$, for the purpose of compressing the sheaf while it is being bound.

This bar passes back and forth over the arms B and C, being secured to the end of a reciprocating rod, $g$, to which motion is imparted by means of the levers $h$ and L and connecting-rod $i$.

The lever L is operated by the person in charge of the machine, and is pivoted to the platform.

This lever L works in connection with a pawl and ratchet, W, for the purpose of holding the bar K in position while the sheaf is being bound, which said pawl is disengaged by means of a double lever, $j$, secured to the lever L, the upper ends of both of which are grasped by the hand of the operator when the pawl is to be disengaged.

A small spring, $z$, is provided, located between the upper arms of the levers, for the purpose of keeping the pawl engaged with the ratchet-teeth until it is desired to release it.

At the end of the rod F a portion is cut away on each side, so as to form a recess to admit the shanks of the nippers E, so that the outer sides of the latter are on a line with the outer surface of the rod when the jaws are closed.

Between the shanks of the nippers, and secured to the end of the rod F, are two springs, $y$, for the purpose of opening the jaws and keeping them apart excepting when they are grasping the string; and when grasping the string the said jaws are kept closed by means of spring bolts $k\ k$, which enter into slots provided in the end of each shank.

On the under side of the rod G is a longitudinal groove, in which works a pin secured within the rod F, for the purpose of preventing the latter from turning while in operation.

M represents another pair of nippers, located underneath those last mentioned, and similarly secured on the end of a rod, N, which fits and works upon an inner rod, O, rigidly secured at one end to a block attached to the platform.

A reciprocating motion is imparted to this rod N by means of a pin, $l$, working within a curved slot in the end of a lever, $m$, to which said lever motion is imparted through the medium of a connecting-rod and a crank-pin secured to the wheel I', a pinion rigidly attached to which latter gears with the driving-wheel J.

The jaws of these nippers M are provided with cutting or knife-edges for the purpose of cutting the string after the sheaf has been bound.

Within each shank of the nippers is a spring bolt, $n$, which enters a slot or mortise in the end of the rod N, for the purpose of keeping the jaws closed while they are grasping the string; and secured at the end of the rod N, and operating upon the shanks is a spring, $x$, which serves to open the jaws and keep them apart when the string is to be released.

P represents a third pair of nippers, which are also provided with cutting or knife-edges, and are in form and construction similar to those last mentioned and described.

These nippers P are secured at the end of a spiral arm, Q, which fits and works upon an arm, R, which latter is rigidly secured to the platform.

The arm Q has a reciprocating motion, and moves simultaneously with the rod N, but in an opposite direction, and is operated by means of the pulley I' through the medium of the levers $o\ o'$ and connecting-rod $p$.

A pin, $q$, secured within the outer end of the arm Q, works within a spiral groove provided in the arm R, by means of which the nippers P are caused to revolve around the line of motion of the nippers M, so as to carry the string around the same, and in connection therewith to form the knot.

The outer end of the spiral arm Q is cylindrical, and a collar, $r$, fits and works within a peripheral groove on the former, which said collar is provided with projections which fit and work in slots on the bifurcated ends of the lever $o$, by which means the spiral arm Q is allowed freely to revolve on the arm R.

S is a wedge-shaped slot, which receives and closes the jaws of the nippers E when they have grasped the string.

T is a wedge-shaped slot provided on the end of the arm R for the purpose of closing the jaws of the nippers M.

U is an arm attached to the platform, and provided with a wedge-shaped slot at its end for the purpose of closing the jaws of the nippers P.

V and V' are spring catches or jaws, into which the string is drawn by the nippers M and P, and which hold the same until the said nippers make their next forward movement.

$s\ s$ are springs secured to the platform, which press against the projecting pins $u\ u$ that work in slots in the shanks of the nippers P, and are secured to the spring bolts located in the said shanks, the object of which is to open the jaws of the nippers P as soon as the latter have drawn the end of the string into the spring catch or jaws V.

Figure 5:
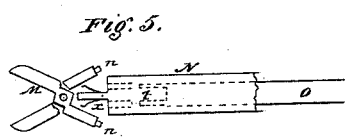
Figure 5 is a detached plan view of the lower pair of nippers and rod.
Figure 6:
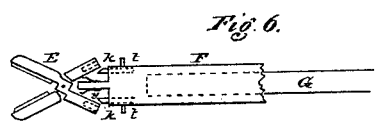
Figure 6 is a similar detached view of the upper pair of nippers.
Figure 7:
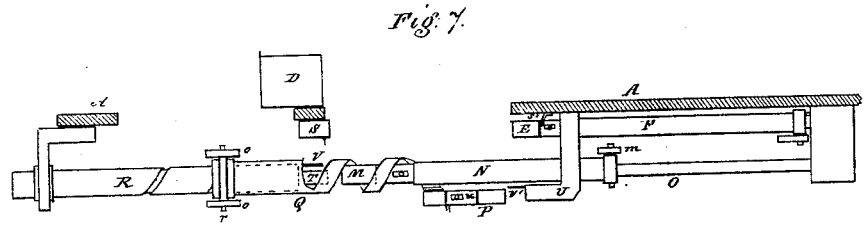
Figure 7 is a detached view showing the relative position of the lower pair of nippers and those secured to the spiral arm when forming the knot.

The jaws of the nippers M are opened when they have drawn their end of the string into the spring catch or jaws V' by means of two pins, $t\ t$, fig. 5, provided on the end of the rod O, which enter the slots in the end of the rod N and push out the spring bolts $n\ n$.

S' is a spring secured to the platform, which pushes back the spring bolts $k\ k$ in the end of the rod F, and thus opens the jaws of the nippers E when the latter start on their forward movement to seize the string.

These reciprocating and intermittent movements of the nippers E, M, and P are imparted, through the medium of the levers and connecting-rods above-mentioned, by the driving-wheel J.

Figure 4:
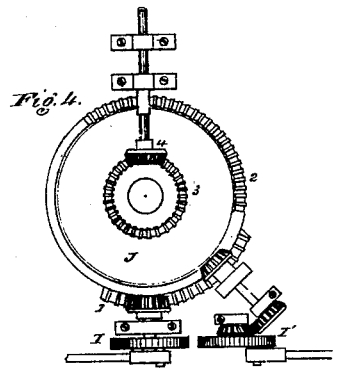
Figure 4 is a detached view of the under side of the driving-wheel.

This driving-wheel J is in the form of a bevel gear-wheel, and is provided with three rows of beveled gears, formed upon or secured to a disk, the outer row of which, marked 1, fig. 4, extends about one-fourth of the circumference of the disk and meshes with a pinion-wheel on the shaft of the crank-wheel I, for the purpose of imparting motion to the nippers E through the medium of the levers $d$, $e$, and $e'$.

The intermediate row, marked 2, extends about half around the disk and drives the crank-wheel I', from which, through the medium of the levers $m$ and $o\ o'$ and connecting-rod $p$, motion is imparted to the nippers M and P, which latter commence their forward movement as soon as the nippers E have drawn the string across the arms B and C.

The inner row, marked 3, meshes with a pinion, 4, secured to the horizontal shaft, by which the power requisite to drive my improved machine is transmitted from the machinery of the reaper.

The operation is as follows:

The grain is received upon the platform A as it leaves the cutters of the reaper.

The nippers E, being operated as before described, pass over the opening in the platform above the arms B and grasp the string which hangs from the perforation in the box D, and the jaws of the said nippers are immediately closed by reason of their entering the wedge-shaped slot S, and are kept closed by means of the spring bolts $k\ k$, which enter the mortises in the end of their shanks. The nippers E then recede and carry the end of the string over to the other side, holding it there until the nippers M and P have performed their movements, hereinafter described.

A sufficient quantity of grain to form a sheaf is then deposited, through the opening in the platform, upon the curved arms B, which are raised by means of the operator pressing his foot against the lever b.

The nippers M and P then pass over the opening, above and across the sheaf, simultaneously in opposite directions, and seize the opposite ends of the string, and their jaws are closed by reason of their entering the slots T and U respectively, and are kept closed by means of the spring bolts located within their shanks, which enter the mortises in the rod N and arm Q.

On receding these nippers carry their respective ends of the string back to the point from which they started and force them into the jaws V and V', by which latter the ends of the string are retained until again seized by the jaws of the nippers in their next forward movement.

It will be seen that the nippers P revolve around the nippers M and rod N, and thus form one-half of a double knot. The other half of the double knot is formed by means of the nippers M and P repeating the movements just described.

When the nippers M have drawn their end of the string into the jaws V' the further retrograde movement of the same causes the pins t t to enter the mortises in the end of the rod N, by which means the spring bolts n n are pushed out of the mortises, and the jaws of the nippers fly open by the action of the spring x, ready to grasp the string again in their next forward movement; and in a similar manner the jaws of the nippers P are released and thrown open immediately after they have drawn their end of the string into the jaws V by means of the projecting pins u coming in contact with the springs s.

During the movements above described the sheaf is compressed by means of the arms f f on the bar K, and when they have been completed the operator releases the arms f f and B, and the sheaf drops out.

The nippers E then again move forward to seize the end of the string (which has been cut by the knife-edges on the nippers M and P before the sheaf was allowed to drop out) to tie another sheaf, and immediately on their commencing their forward movement the projecting pins t strike against the spring s' and release the jaws of the nipper, which are thus thrown open, ready to again seize the string.

Having thus described my invention,

What I claim as new, and desire to secure by Letters Patent of the United States, is—

1. The combination of the nippers E, mounted upon the rod F, with the slot S and spring S', all these parts being constructed and operated substantially as and for the purpose set forth.

2. The combination of the nippers M and P, spiral arm Q, and reciprocating rod N, all these parts being constructed and operated as herein shown and described, and for the purposes set forth.

3. The combination of the nippers M and P, arm Q, rod N, slot T and U, springs S, and pins t, all these parts being constructed and operated substantially as herein shown and described, and for the purposes set forth.

4. The combination of the nippers M and P, arm Q, rod N, spring S, pins t, and jaws V and V', as shown and described.

5. The combination of the nippers E, rods F and G, levers d, e, and e', wheel I, and driving-wheel J, substantially as shown and described.

6. The construction and arrangement of the nippers M and P, rods N and O, arms Q and R with the levers o, o', and m, connecting-rod p, crank-wheel I, and driving-wheel J, substantially as herein shown and described, and for the purposes set forth.

PREVIZE A. PERRY.

Witnesses:
JOHN S. THORNTON,
CHARLES ROGERS.